United States Patent
Lu

(10) Patent No.: US 9,833,976 B2
(45) Date of Patent: Dec. 5, 2017

(54) DEFECT RESISTING ACOUSTIC POLYMER INTERLAYERS

(71) Applicant: Solutia Inc., St. Louis, MO (US)

(72) Inventor: Jun Lu, East Longmeadow, MA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 13/781,859

(22) Filed: Mar. 1, 2013

(65) Prior Publication Data

US 2013/0236693 A1 Sep. 12, 2013

Related U.S. Application Data

(60) Provisional application No. 61/609,092, filed on Mar. 9, 2012.

(51) Int. Cl.
*B32B 27/08* (2006.01)
*B32B 27/22* (2006.01)
(Continued)

(52) U.S. Cl.
CPC ............ *B32B 27/30* (2013.01); *B32B 7/02* (2013.01); *B32B 17/10587* (2013.01); *B32B 17/10761* (2013.01); *B32B 27/08* (2013.01); *B32B 2250/03* (2013.01); *B32B 2250/246* (2013.01); *B32B 2270/00* (2013.01); *B32B 2307/538* (2013.01); *B32B 2329/04* (2013.01); *B32B 2329/06* (2013.01); *B32B 2605/006* (2013.01);
(Continued)

(58) Field of Classification Search
CPC ......... B32B 27/08; B32B 27/22; B32B 27/30; B32B 27/42; B32B 3/30; B32B 27/306; B32B 17/10; B32B 17/1055; B32B 17/10577; B32B 17/10587; B32B 17/10605; B32B 17/10761; B32B 2250/03; B32B 2250/246; B32B 2250/40; B32B 2329/06; B32B 2307/10; B32B 2307/102; B32B 2307/538; Y10T 428/31946
USPC ...... 428/141, 172, 437, 501, 524, 98, 411.1, 428/525
See application file for complete search history.

(56) References Cited

U.S. PATENT DOCUMENTS 6,180,246 B1 * 1/2001 Purvis et al. ............... 428/429
6,251,493 B1 * 6/2001 Johnson .................. F16F 1/37
428/220

(Continued)

FOREIGN PATENT DOCUMENTS

EP 2 520 551 A1 11/2012
EP 2 520 552 A1 11/2012
(Continued)

OTHER PUBLICATIONS

Evidentiary reference: Osswald, Understanding Polymer Processing, Mechanical Behavior of Polymers, Chapter 2.1.1., pp. 29-30, Hanser, downloaded on Sep. 10, 2015.*

(Continued)

*Primary Examiner* — Joanna Pleszczynska
(74) *Attorney, Agent, or Firm* — Michelle Bugbee

(57) ABSTRACT

This disclosure is related to the field of polymer interlayers for multiple layer glass panels and multiple layer glass panels having at least one polymer interlayer sheet. Specifically, this disclosure is related to the field of polymer interlayers comprising multiple thermoplastic layers which resist the formation of optical defects.

11 Claims, 2 Drawing Sheets

(51) Int. Cl.
  B32B 27/30 (2006.01)
  B32B 27/42 (2006.01)
  B32B 17/10 (2006.01)
  B32B 7/02 (2006.01)
(52) U.S. Cl.
  CPC .. *Y10T 428/2419* (2015.01); *Y10T 428/24355* (2015.01); *Y10T 428/24942* (2015.01); *Y10T 428/31859* (2015.04)

(56) References Cited

U.S. PATENT DOCUMENTS

| | | | |
|---|---|---|---|
| 6,384,162 B1* | 5/2002 | Zahalka et al. | 526/136 |
| 7,854,993 B2 | 12/2010 | Lu | |
| 7,883,761 B2* | 2/2011 | Bourcier et al. | 428/141 |
| 2006/0210782 A1 | 9/2006 | Lu | |
| 2006/0231189 A1 | 10/2006 | Ma et al. | |
| 2008/0047655 A1 | 2/2008 | Karagiannis et al. | |
| 2008/0268204 A1 | 10/2008 | Bourcier et al. | |
| 2009/0226750 A1* | 9/2009 | Lu | 428/524 |
| 2009/0293952 A1* | 12/2009 | Koran et al. | 136/256 |
| 2012/0244329 A1 | 9/2012 | Iwamoto et al. | |
| 2012/0244364 A1 | 9/2012 | Iwamoto et al. | |
| 2015/0298447 A1 | 10/2015 | Yacovone | |

FOREIGN PATENT DOCUMENTS

| | | |
|---|---|---|
| EP | 2574456 A1 | 4/2013 |
| JP | 1994(H06)-321586 A | 11/1994 |
| JP | 1997(H09)-295839 A | 11/1997 |
| JP | 2007-331959 A | 12/2007 |
| JP | 2011-42552 A | 7/2011 |
| WO | WO 2006/091707 A1 | 8/2006 |
| WO | WO 2006/102049 A2 | 9/2006 |
| WO | WO 2008-128003 A1 | 10/2008 |
| WO | WO 2008-134594 A1 | 11/2008 |
| WO | WO 2009-151952 A2 | 12/2009 |

OTHER PUBLICATIONS

Notification of Transmittal of the International Search Report and the Written Opinion of the International Searching Authority or the Declaration, dated Jun. 21, 2013, received in International Application No. PCT/US2013/029782.
Copending U.S. Appl. No. 14/465,924, filed Aug. 22, 2014, Jun Lu.
Copending U.S. Appl. No. 14/465,930, filed Aug. 22, 2014, Jun Lu.
Office Action dated Apr. 17 dated Aug. 3, 2014 received in co-pending U.S. Appl. No. 13/781,859.
Extended European Search Report dated Oct. 6, 2015 for Application No./Patent No. 13758000.7-1308 / 2822766 PCT/US2013029782.
Office Action dated Nov. 30, 2015 received in co-pending U.S. Appl. No. 14/465,924.
Office Action dated Jan. 14, 2016 received in co-pending U.S. Appl. No. 14/465,930.
Office Action dated Jun. 22, 2016 received in co-pending U.S. Appl. No. 14/465,924.
Office Action dated Aug. 3, 2016 received in co-pending U.S. Appl. No. 14/465,930.

* cited by examiner

DEFECT RESISTING ACOUSTIC POLYMER INTERLAYERS

CROSS-REFERENCES TO RELATED APPLICATION

This application claims priority to U.S. Provisional Application No. 60/609,092, filed Mar. 9, 2012, the disclosure of which is incorporated herein by reference in its entirety.

FIELD OF THE INVENTION

This disclosure is related to the field of polymer interlayers for multiple layer glass panels and multiple layer glass panels having at least one polymer interlayer sheet. Specifically, this disclosure is related to the field of polymer interlayers comprising multiple thermoplastic layers which resist the formation of optical defects

DESCRIPTION OF THE PREFERRED EMBODIMENT(S)

Figure 1:
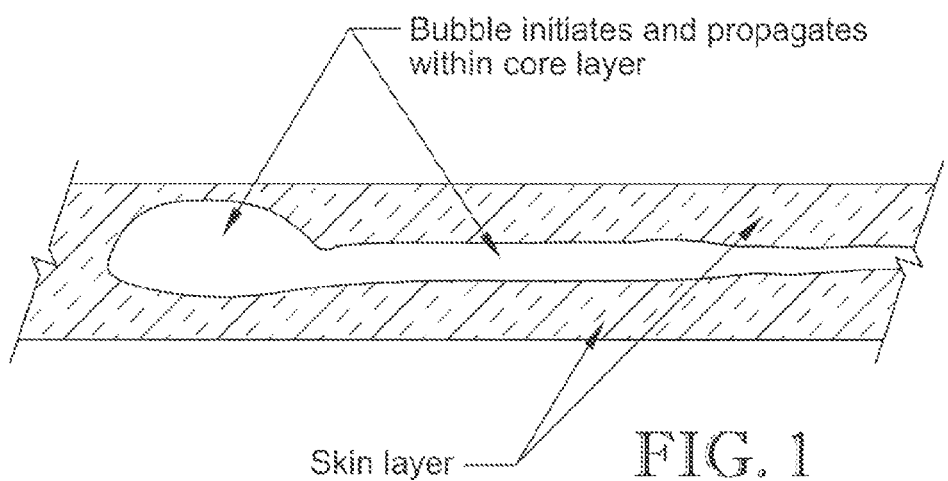
FIG. 1 depicts the initiation and expansion of the air bubbles in a trilayer interlayer.

This disclosure is related to the field of polymer interlayers for multiple layer glass panels and multiple layer glass panels having at least one polymer interlayer sheet. Specifically, this disclosure is related to the field of polymer interlayers comprising multiple thermoplastic layers which resist the formation of optical defects.

Generally, multiple layer glass panels refer to a laminate comprised of an interlayer sandwiched between two panes of glass. The laminated multiple layer glass panels are commonly utilized in architectural window applications and in the windows of motor vehicles and airplanes. These applications are commonly referred to as laminated safety glass. The main function of the interlayer in the laminated safety glass is to absorb energy resulting from impact or force applied to the glass, to keep the layers of glass bonded even when the force is applied and the glass is broken, and to prevent the glass from breaking up into sharp pieces. Additionally, the interlayer generally gives the glass a much higher sound insulation rating, reduces UV and/or IR light transmission, and enhances the aesthetic appeal of the associated window.

In order to achieve the desired and optimal sound insulation for the glass panel, it has become common practice to utilize multilayered interlayers with at least one soft "core" layer sandwiched between two more rigid "skin" layers. These layers of the interlayer are generally produced by mixing a polymer resin such as poly(vinyl butyral) with one or more plasticizers and melt processing the mix into a sheet by any applicable process or method known to one of skill in the art, including, but not limited to, extrusion, with the layers being combined by processes such as co-extrusion and lamination. Other additional ingredients may optionally be added for various other purposes. After the interlayer sheet is formed, it is typically collected and rolled for transportation and storage and for later use in the multiple layer glass panel, as discussed below.

The following offers a simplified description of the manner in which multiple layer glass panels are generally produced in combination with the acoustic interlayers. First, the multilayered interlayer is placed between two substrates and any excess interlayer is trimmed from the edges, creating an assembly. Then, air is removed from the assembly by an applicable process or method known to one of skill in the art; e.g., through nip rollers, vacuum bag or another de-airing mechanism. Additionally, the interlayer is partially press-bonded to the substrates by any method known to one of ordinary skill in the art. In order to form a final unitary structure, this preliminary bonding is then rendered more permanent by a high temperature and pressure lamination process known to one of ordinary skill in the art such as, but not limited to, autoclaving.

Glass panels containing these multilayered acoustic interlayers can, under extreme conditions, develop defects commonly known as iceflowers (also known as snowflakes), which initiate in the presence of excessive residual, trapped air in the interlayer and stress in the glass. Specifically, during the manufacturing process of laminated multiple layer glass panel constructs, air and other gasses often become trapped in the interstitial spaces between the substrates and the interlayer or between the individual layers of the multilayered interlayer when these layers are stacked together to form the multilayered interlayer. As noted above, this trapped air is generally removed in the glazing or panel manufacturing process by vacuum or nip roll de-airing the construct. However, these technologies are not always effective in removing all of the air trapped in the interstitial spaces between the substrates. These pockets of air are particularly evident with mismatched glass (e.g., tempered glass, heat strengthened glass, and thick, annealed glass) and in windshields, where the curvature of the glass generally results in gaps of air. These gaps of air in windshields are commonly referred to as "bending gaps." Additionally, when a bending gap is present during autoclaving, heat and pressure compress the glass to conform to the interlayer and narrow the gap, resulting in high stresses in the glass in the original gap area.

As noted above, the de-airing technologies are not always effective in removing all of the air from the glass panel assembly. As a result, there is residual air presented between the glass and interlayer. During autoclaving, the residual air dissolves into the interlayer, mostly in the skin layer, under heat and pressure. The residual air located in the skin layer can move into the core layer or skin-core interphase, and it eventually partitions between skin layer and core layer to reach an equilibrium state. When a large amount of residual air (e.g., excessive residual air) is present in the interlayer, air bubbles can nucleate, especially at high temperatures, as the interlayer becomes soft and is less resistant to the nucleation.

With the conventional acoustic interlayer, air bubbles commonly first form within the soft core layer as nucleation favors the less viscous medium. In warm to hot climates, such as during the summer season, the temperature of glass can elevate to 50° C. to 100° C. in the laminated glass installed on buildings and vehicles. At these elevated temperatures, forces due to stresses in glass panels or windshields exert pressure on the glass perpendicularly to their plane and in the opposite direction, pulling the glass panels away from each other in an effort to restore them to their original states. The stress reduces the resistance of the air to nucleate and expand and allows the bubble to grow within the core layer.

Figure 2:
FIG. 2 depicts an example of a defect commonly found in glass panels with multilayered interlayers.

FIG. 1 depicts the initiation and expansion of the air bubbles in a trilayer interlayer. Regardless of where the bubbles initially form, at elevated temperatures (e.g., 50° C. to 100° C.), the stresses from the bending gap or glass mismatch cause the bubbles to expand in the path of least resistance in random radial directions within the core layer. As the defects continue radial expansion, branches and dendritic-like features form, and give the undesirable optical appearance of iceflowers. An example of such a defect formed in an installed windshield is shown in FIG. 2. Additionally, the formation of iceflowers within the core layer typically leads to a separation between the layers, reducing the structural integrity of the panel.

Accordingly, there is a need in the art for the development of a multilayered interlayer that resists the formation of these optical defects without a reduction in other optical, mechanical, and acoustic characteristics of a conventional multilayered interlayer. More specifically, there is a need in the art for the development of multilayered interlayers that reduce the stress in glass and allow air to be removed during glass panel manufacturing.

Because of these and other problems in the art, described herein, among other things are multilayered interlayers comprised of layers having different rheology properties formed by altering the molecular weight and composition of the layers. In an embodiment, these multilayered interlayers comprise: a first polymer layer comprising plasticized poly(vinyl butyral) having a molecular weight of less than about 140,000 Daltons; a second polymer layer comprising plasticized poly(vinyl butyral) having a molecular weight of greater than about 140,000 Daltons; and a third polymer layer comprising plasticized poly(vinyl butyral) having a molecular weight of less than about 140,000 Daltons. The second polymer layer is disposed between the first polymer layer and the third polymer layer, resulting in two skin layers and a central core layer.

The use of skin layers having lower molecular weight of the present disclosure allows the flow of the interlayer to be increased at autoclaving temperature without sacrificing other favorable/desired characteristics of conventional multilayered interlayers. In other words, the use of skin layers with lower molecular weight of the present disclosure affects their flow during autoclaving, while maintaining all other characteristics of conventional multilayered interlayers as measured by sound transmission loss, optical properties, mechanical strength, and impact resistance. Similarly, the plasticizer loading, a mixture of two or more plasticizers, the residual hydroxyl content, or any combination or balance of the three properties can be manipulated to further aid in achieving a high flow skin layer. As a result, the stress levels that are inherent in windshield and laminated glass assemblies can be reduced by partially filling in the gap area with the high flow skin layers, thereby reducing the optical defects common with multilayered interlayers.

Additionally, the surface of the multilayered interlayers may be embossed to produce consistent surface roughness and channels for air to escape during the de-airing process; the amount of air available for bubble nucleation and expansion is thus greatly reduced, thereby further reducing the defects.

Advantageously, the disclosed interlayers effectively reduce or eliminate the trapped air and gaps and stresses that result from bending the multiple layer panels (commonly referred to herein as "bending gaps"), while maintaining the acoustic and optical properties of the conventional multilayered interlayers. Because the trapped air and bending gaps inherent in multiple layer panels are reduced, the formation of optical defects such as iceflowers (or snowflakes) are also thereby reduced or eliminated.

In order to facilitate a more comprehensive understanding of the interlayers comprising high flow skin layers disclosed herein, this application begins with some definitional terms, a general view of the manufacturing process, and a summary of common components found in an interlayer, both generally and in interlayers of the present disclosure, and the formation thereof, prior to discussing the incorporation of high flow skin layers into interlayers to reduce the formation of optical defects.

The terms "polymer interlayer sheet," "interlayer," and "polymer melt sheet" as used herein, may designate a single-layer sheet or a multilayered interlayer. A "single-layer sheet," as the names implies, is a single polymer layer extruded as one layer. A multilayered interlayer, on the other hand, may comprise multiple layers, including separately extruded layers, co-extruded layers, or any combination of separately and co-extruded layers. Thus, the multilayered interlayer could comprise, for example: two or more single-layer sheets combined together ("plural-layer sheet"); two or more layers co-extruded together ("co-extruded sheet"); two or more co-extruded sheets combined together; a combination of at least one single-layer sheet and at least one co-extruded sheet; and a combination of at least one plural-layer sheet and at least one co-extruded sheet. In various embodiments of the present invention, a multilayered interlayer comprises at least two polymer layers (e.g., a single layer or multiple layers co-extruded) disposed in direct contact with each other, wherein each layer comprises a polymer resin, as detailed more fully below. In this regard, as used herein, "skin layer" generally refers to outer layers of the interlayer and "core layer" generally refers to the inner layer(s). Thus, one exemplary embodiment would be: skin layer II core layer II skin layer. It should be noted, however, further embodiments include interlayers having more than three layers (e.g., 4, 5, 6, or up to 10 individual layers).

Additionally, it is contemplated that polymer interlayer sheets as described herein may be produced by any suitable process known to one of ordinary skill in the art of producing polymer interlayer sheets that are capable of being used in a multiple layer panel. For example, it is contemplated that the polymer interlayer sheets may be formed through solution casting, compression molding, injection molding, melt extrusion, co-extrusion, melt blowing or any other procedures for the production and manufacturing of a polymer interlayer sheets known to those of ordinary skill in the art. Further, in embodiments where multiple polymer interlayers are utilized, it is contemplated that these multiple polymer interlayers may be formed through co-extrusion, blown film, dip coating, solution coating, blade, paddle, air-knife, printing, powder coating, spray coating or other processes known to those of ordinary skill in the art.

The final interlayer, whether formed from extrusion or co-extrusion, generally has a random rough surface topography as it is formed through melt fractures of polymer melt as it exits the extrusion die and may additionally be embossed over the random rough surface on one or both sides (e.g., the skin layers) by any method of embossment known to one of ordinary skill in the art. An example of such an embossment method is disclosed in U.S. Pat. No. 4,671,913 (the entire disclosure of which is incorporated herein by reference). The embossment creates minute raised and depressed portions on the surface of the polymer interlayer, which has been shown to be effective in enhancing the de-airing process and reducing the occurrence of air bubbles. For example, it has now been discovered that embossed interlayers with a surface roughness (Rz) of 25 to 50 microns after heating for 5 minutes at 100° C. work exceptionally well for both nip roll and vacuum deairing and exhibit superior resistance to iceflower defect formation when compared to non-embossed interlayers. In other embodiments of the invention ranges for surface roughness (Rz) after heating for 5 minutes at 100° C. could be 25 to 66 microns, 25 to 60 microns, and 25 to 65 microns.

Any multilayered interlayer can be varied by manipulating the composition, thickness, or positioning of the layers and the like. Thus, it is contemplated that the skin layers and the core layer(s) of the multilayered interlayer sheets may be comprised of the same thermoplastic material or different thermoplastic materials. Typical polymers include, but are not limited to, poly(vinyl butyral) ("PVB"), polyurethane, polyvinyl chloride, poly(ethylene-co-vinyl acetate), combinations of the foregoing, and the like. PVB, polyvinyl chloride, and polyurethane are preferred polymers generally for interlayers; PVB is particularly preferred. For example, the multilayered interlayer can consist of PVB as the skin layer and polyvinyl chloride or polyurethane as the core layer. Other example includes polyvinyl chloride or polyurethane as the skin layer and PVB as the core layer. Alternatively, the skin and core layers may all be PVB using the same or different starting resins.

Various adhesion control agents ("ACAs") can be used in the interlayers of the present disclosure. ACAs in the interlayer formulation control adhesion of the sheet to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Other additives may be incorporated into the interlayer to enhance its performance in a final product and impart certain additional properties to the interlayer. Such additives include, but are not limited to, dyes, pigments, stabilizers (e.g., ultraviolet stabilizers), antioxidants, anti-blocking agents, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

In various embodiments of interlayers of the present disclosure, the interlayer will comprise about 30 to about 60 phr (parts per hundred parts resin) total plasticizer. While the total plasticizer content is indicated above, the plasticizer content in the skin layer(s) or core layer(s) can be different from the total plasticizer content. In addition, the skin layer(s) and core layer(s) can have different plasticizer contents, as each respective layer's plasticizer content at the equilibrium state is determined by its respective residual hydroxyl content, as disclosed in U.S. Pat. No. 7,510,771 (the entire disclosure of which is incorporated herein by reference). For example, at equilibrium the interlayer could comprise two skin layers, each with 38 phr plasticizer, and a core layer with 75 phr plasticizer, for a total plasticizer amount for the interlayer of about 54.3 phr when the combined skin layer thickness equals that of the core layer. For thicker or thinner skin layers, the total plasticizer amount for the interlayer would change accordingly.

The flow of skin layers can be increased at autoclaving temperature by properly choosing the types of plasticizer. Plasticizers that are less compatible with thermoplastic polymers such as PVB at ambient temperature require high loading to achieve the characteristics of conventional multilayered interlayers. These high loading plasticizers may, however, become more compatible at high temperature, resulting in increased autoclaving flow because the high plasticizer loading increases the "free volume" of the polymer chain. Such less compatible plasticizers include, but are not limited to, higher molecular weight plasticizers such as polymeric plasticizers (polyadipates with molecular weight less than 2,000 Daltons), soybean oils and epoxidized soybean oils. Mixtures of two or more plasticizers of different compatibilities can also be used to increase autoclaving flow for skin layers. The skin layer will generally comprise about 30 to about 55 phr plasticizer(s), more preferably about 35 to about 50 phr without affecting the characteristics of conventional multilayered interlayers. Of course, other quantities can be used as is appropriate for the particular application.

In some embodiments, the conventional plasticizer has a hydrocarbon segment of fewer than 20, fewer than 15, fewer than 12, or fewer than 10 carbon atoms. Suitable conventional plasticizers for use in these interlayers include esters of a polybasic acid or a polyhydric alcohol, among others. Suitable plasticizers include, for example, triethylene glycol di-(2-ethylhexanoate) ("3-GEH"), tetraethylene glycol di-(2-ethylhexanoate), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, polymeric adipates, soybean oils, and epoxidized soybean oils, and mixtures thereof. A more preferred plasticizer is 3-GEH. Additionally, plasticizers that are compatible in high temperatures may be preferred to further increase the flow of the interlayer.

As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the melt that was used to produce the interlayer.

Plasticizers work by embedding themselves between chains of polymers, spacing them apart (increasing the "free volume") and thus significantly lowering the glass transition temperature ($T_g$) of the polymer resin (typically by 0.5-4° C./phr), making the material softer. In this regard, the amount of plasticizer in the interlayer can be adjusted to affect the glass transition temperature ($T_g$). The glass transition temperature ($T_g$) is the temperature that marks the transition from the glassy state of the interlayer to the rubbery state. In general, higher amounts of plasticizer loading will result in lower $T_g$. Conventional, previously utilized interlayers generally have had a $T_g$ in the range of about 0° C. for acoustic (noise reducing) interlayers to about 45° C. for hurricane and aircraft interlayer applications.

The glass transition temperature ($T_g$) is determined by dynamic mechanical analysis (DMA). The DMA measures the storage (elastic) modulus (G') in Pascals, loss (viscous) modulus (G") in Pascals, loss (damping) factor (LF) [tan (delta)] of the specimen as a function of temperature at a given frequency, and temperature sweep rate. The polymer sheet sample is tested in shear mode at an oscillation frequency of 1 Hertz as the temperature of the sample is increased from −20° C. to 70° C. at a rate of 2° C./minute. The $T_g$ is then determined by the position of the loss factor peak on the temperature scale in ° C.

An interlayer's glass transition temperature is also correlated with the stiffness of the interlayer—the higher the glass transition temperature, the stiffer the interlayer. Generally, an interlayer with a glass transition temperature of 30° C. or higher increases windshield strength and torsional rigidity. A soft interlayer (generally characterized by an interlayer with a glass transition temperature of lower than 30° C.), on the other hand, contributes to the sound dampening effect (i.e., the acoustic characteristics). The multilayered interlayers of the present disclosure combine these two advantageous properties (i.e., strength and acoustic) by utilizing harder or stiffer skin layers laminated with a softer core layer (e.g., stiff//soft//stiff), with the skin layers having increased flow at autoclave temperatures. In various embodiments, the multilayered interlayers generally comprise skin layers with a glass transition temperature of about 30° C. to about 55° C. and core layer(s) with a glass transition temperature of about 0° C. to about 10° C. For example, the following are some preferred multilayered configurations:

($T_g$>25° C.)//($T_g$<10° C.)//($T_g$>25° C.);

(25° C.<$T_g$<55° C.)//($T_g$<10° C.)//(25° C.<$T_g$<55° C.); and (25° C.<$T_g$<55° C.)//($T_g$>−15° C.)//(25° C.<$T_g$<55° C.).

These configurations are merely exemplary and are in no way meant to be limiting to the types of multilayered configurations contemplated by this disclosure. Advantageously, though, with skin layers having increased flow at autoclaving temperature, the multilayered interlayers will reduce the iceflower defects.

The PVB resin is produced by known aqueous or solvent acetalization processes by reacting polyvinyl alcohol ("PVOH") with butyraldehyde in the presence of an acid catalyst, separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399, by B. E. Wade (2003), the entire disclosures of which are incorporated herein by reference. The resin is commercially available in various forms, for example, as Butvar® Resin from Solutia Inc.

As used herein, residual hydroxyl content (calculated as PVOH) refers to the amount of hydroxyl groups remaining on the polymer chains after processing is complete. For example, PVB can be manufactured by hydrolyzing poly (vinyl acetate) to PVOH, and then reacting the PVOH with butyraldehyde to form PVB. In the process of hydrolyzing the poly(vinyl acetate), typically not all of the acetate side groups are converted to hydroxyl groups. Further, the reaction with butyraldehyde typically will not result in all hydroxyl groups being converted into acetal groups. Consequently, in any finished poly(vinyl butyral), there typically will be residual acetate groups (as vinyl acetate groups) and residual hydroxyl groups (as vinyl hydroxyl groups) as side groups on the polymer chain. As used herein, residual hydroxyl content is measured on a weight percent basis per ASTM 1396.

In various embodiments, the residual hydroxyl contents of the poly(vinyl butyral) resins for skin layer(s) and core layer(s) are different. The resin for the core layer(s), for example, can comprise about 9 to about 18 weight percent (wt. %) residual hydroxyl groups calculated as PVOH, about 9 to about 16 wt. % residual hydroxyl groups calculated as PVOH, or about 9 to about 14 wt. % residual hydroxyl groups calculated as PVOH. The resin for the skin layer(s), for example, can comprise about 13 to about 35 weight percent (wt. %) residual hydroxyl groups calculated as PVOH, about 13 to about 30 wt. % residual hydroxyl groups calculated as PVOH, or about 15 to about 22 wt. % residual hydroxyl groups calculated as PVOH; and most preferably, for certain embodiments, about 17.25 to about 22.25 wt. residual hydroxyl groups calculated as PVOH. The resin for the core layer(s) or for the skin layer(s) or for both the skin layer(s) and core layer(s) can also comprise less than 20 wt. % residual ester groups, less than 15 wt. %, less than 13 wt. %, less than 11 wt. %, less than 9 wt. %, less than 7 wt. %, less than 5 wt. %, or less than 1 wt. % residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference).

Notably, for a given type of plasticizer, the compatibility of the plasticizer in the polymer is largely determined by the hydroxyl content of the polymer. Polymers with greater residual hydroxyl content are typically correlated with reduced plasticizer compatibility or capacity. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

Standard PVB resin found in conventional single-layered interlayers and skin layers in multilayered interlayers typically have a molecular weight of greater than about 150,000 Daltons, as measured by size exclusion chromatography using low angle laser light scattering. As used herein, the term "molecular weight" means the weight average molecular weight. Surprisingly, however, it has now been discovered that low molecular weight skin layers (i.e., less than about 140,000 Daltons) can be used to increase the flow in PVB interlayers while not negatively affecting other properties of the interlayers. Specifically, the flow of the resultant interlayer under higher temperatures is effectively increased, especially at the temperature where the PVB binds to the glass during manufacturing, e.g., autoclave, as discussed below. As a result, the stress levels in windshields and laminated glass are reduced because the interlayer partially fills in the gap area during windshield assembly (e.g., de-airing) and autoclave. Moreover, the increased flow as a result of the lower molecular weight does not affect the glass transition temperature or the stiffness of the layers at normal temperature. The high flow interlayers of the present disclosure have skin layers with molecular weights of less than about 140,000 Daltons, less than about 135,000 Daltons less than about 130,000 Daltons, less than about 125,000 Daltons, less than about 120,000 Daltons, less than about 115,000 Daltons, less than about 110,000 Daltons, ranging from less than 140,000 Daltons to more than 110,000 Daltons, and with core layers with a molecular weight generally greater than about 140,000 Daltons, or greater than 150,000 Daltons, or greater than 300,000 Daltons. In another embodiment of the invention, the high flow interlayers of the present disclosure have skin layers with molecular weights of less than about 140,000 Daltons, less than about 130,000 Daltons, less than about 120,000 Daltons, less than about 110,000 Daltons (and with core layers with a molecular weight generally greater than about 140,000 Daltons). These interlayers have shown a 50% or more reduction in the rate or severity of iceflower formation. Surprisingly, however, the sound transmission loss, mechanical, and optical properties are not adversely affected with the increased flow of the skin layers.

As noted above and throughout, the multilayered interlayers of the present disclosure are often incorporated into a multiple layer panel, and most commonly, disposed between two substrates, such as glass or acrylic and preferably a pair of glass sheets. An example of such a construct would be: (glass)//(multilayered interlayer)//(glass), where the skin layer(s) have a low molecular weight, a higher loading of plasticizer, a mixture of two or more plasticizers, and/or an embossed surface roughness which differ from the composition and characteristics of the core layer(s). These examples of multiple layer panels are in no way meant to be limiting, as one of ordinary skill in the art would readily recognize that numerous constructs other than those described above could be made with the interlayers of the present disclosure.

Glass laminates using interlayers of the present disclosure can be prepared by known procedures. In an embodiment, the polymer interlayer and glass are assembled and heated to a glass temperature of about 25° C. to 60° C. and then passed through a pair of nip rolls to expel trapped air to form an assembly. The compressed assembly is then heated, for example by infrared radiation or in a convection oven, to a temperature of about 70° C. to 120° C. The heated assembly is then passed through a second pair of nip rolls followed by autoclaving the assembly at about 130° C. to 150° C. and about 1,000 to 2,000 kilopascals (kPa) for about 30 minutes. Non-autoclave methods, such as those disclosed in U.S. Pat. No. 5,536,347 (the entire disclosure of which is incorporated herein by reference), are also useful. Further, in addition to the nip rolls, other means for use in de-airing of the interlayer-glass interfaces known in the art and that are commercially practiced include vacuum bag and vacuum ring processes in which a vacuum is utilized to remove the air.

In order to help comprehend the interlayer of the present disclosure, it is also useful to have an understanding of the properties and characteristics associated with a polymer interlayer sheet and formulas by which these properties and characteristics of a polymer interlayer sheet are measured. The "flow," as that term is used herein, is measured as the deformation (reduction of sample thickness normalized according to the standard interlayer thickness of 0.76 mm) when a certain point load pressure (i.e., 4.5 psi) is applied onto the sample surface in the thickness direction and when the sample is being heated from 40° C. to 135° C. at 10° C./min heating rate. In other words, as the load pressure is applied to the sample, the PVB 'spreads' or flows to the sides and the point at which the load is applied becomes thinner (or deforms a certain amount), making the PVB thickness at that point less; thus, higher deformation (i.e., a larger number) equates to higher flow at the testing temperature. The flow is commonly measured as the DF135 by a thermo-mechanical analysis apparatus. As an example, under the aforementioned testing, a flow of 0.242 mm means that an interlayer with 0.76 mm thickness will deform 0.242 mm in the thickness direction at the point where the load pressure is applied. A standard, conventional skin layer of a multi-layered interlayer has a flow of less than about 0.18 mm. The skin layers the current disclosure, on the other hand, have a flow of greater than about 0.18 mm, greater than about 0.19 mm, greater than about 0.20 mm, greater than about 0.22 mm, greater than about 0.23 mm, greater than about 0.24 mm, 0.19 to about 0.26, and about 0.19 mm to about 0.37 mm.

Polymer stress relaxation measurement provides another means for quantifying the flow at high temperatures such as autoclaving temperature. The stress relaxation measurement for the skin layers of the present disclosures, which utilizes a dynamic mechanical analyzer, is determined by instantaneously applying a 20% shear strain at 150° C. to the skin layer sample and holding the strain constant while the stress—e.g., the stress relaxation modulus (G'(t))—is measured as a function of time. The stress relaxation modulus measured after 100 seconds is then used to determine the relative autoclaving flow (in Pascals). The lower the stress relaxation modulus, the higher the polymer flows, and vice versa. A standard, conventional skin layer of a multilayered interlayer has a stress relaxation modulus of greater than about 110 Pascals. The skin layers the current disclosure, on the other hand, have a stress relaxation modulus of less than about 100 Pascals, less than about 70 Pascals, less than about 50 Pascals, and less than about 25 Pascals.

Figure 3:
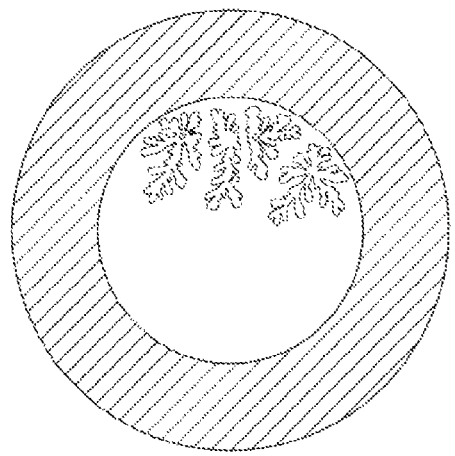
FIG. 3 depicts an example of iceflowers formed within a polyethylene terephthalate (PET) film in accordance with the iceflower test.

As stated above, optical defects known as iceflowers are commonly found in trilayer laminates. The formation of iceflowers in trilayer acoustic PVB laminates can be tested by simulating the real world situation in windshields and other glazings where the combination of large bending gaps and poor de-airing are known to be among the root causes for iceflower development in the field. First, a 30 cm by 30 cm trilayer interlayer with a polyethylene terephthalate (PET) film ring (with an inside diameter of 7.5 cm; an outside diameter of 14 cm; and a thickness of 0.10 mm to 0.18 mm) placed in the center is sandwiched between two 30 cm by 30 cm pieces of glass. The construct is then pre-laminated and autoclaved. The resulting laminates are allowed to condition at room temperature for 48 hours, baked in a conventional oven (at 80° C.) for 48 hours, and then allowed to cool. The laminates are then visually inspected to determine the rate of iceflower formation in the laminate (e.g., the percentage of laminates that developed iceflower defects) and the percentage of area within the PET ring with iceflower defects, an example of which is shown in FIG. 3. Additionally, the laminates are visually inspected to determine the percentage of iceflower formation within the entire laminate (including both inside and outside the PET film area).

Figure 4:
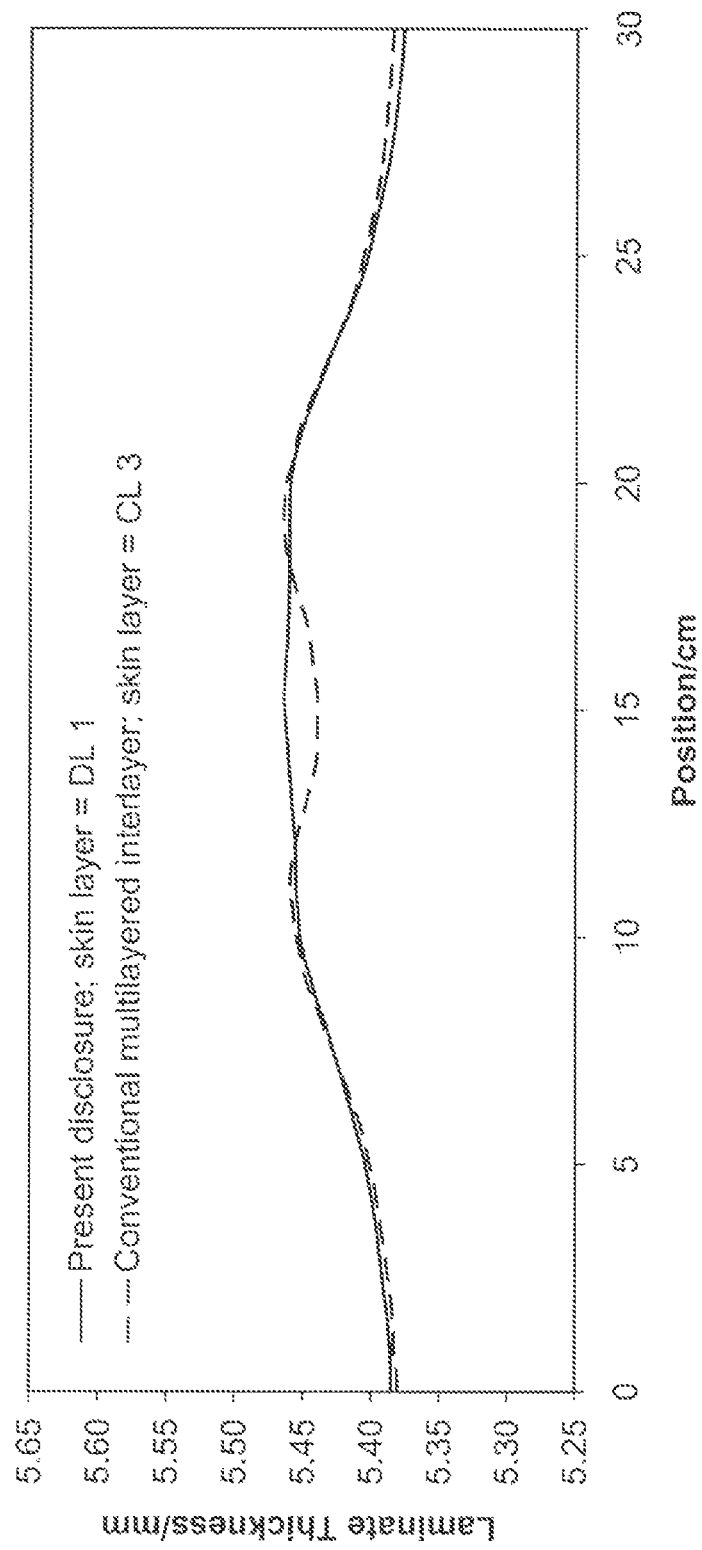
FIG. 4 depicts the bending stress in conventional multilayered interlayer laminates and the reduction of such stress in the interlayers of the present disclosure.

The thickness profile of the laminates can also be measured to determine the stress of the glass. The presence of the PET film ring creates a gap in the laminate, which under autoclaving heat and pressure, results in glass being pressed inward from the edge of the glass to around the film ring. Additionally, glass is bent inward inside the ring area and creates a sagging effect, as shown by the dashed curve in FIG. 4. The sagging inside the ring area results in a highly localized stress in the glass. Advantageously, the disclosed interlayer allows the skin layer to flow into the ring area under autoclaving temperature, and reduces sagging and minimizes the stress in the glass as shown by the solid curve in FIG. 4. Both laminates were made with 2.3 mm clear glass.

EXAMPLES

Exemplary skin layers of the present disclosure (designated as "Disclosed Layers" and as shown as DL 1-9 in Table 1 below) and conventional skin layers (designated as "Conventional Layers" and as shown as CL 1-3 in Table 1 below) were produced by mixing and melt-extruding 100 parts poly(vinyl butyral) resin with differing compositions (e.g., molecular weight and PVOH content)) and various amounts of plasticizer, as shown in the following Table 1, and other common additives (as described above). The skin layers were then measured for autoclaving flow properties by the methods described above. Additionally, the skin layers depicted in Table 1 were then used to construct various multilayered interlayers as shown in Table 2 and Table 3 and as described more fully below.

lower molecular weight. As can be seen, the lowering of the molecular weight, while keeping the PVOH level, plasticizer content and Tg the same, significantly increases the flow of the Disclosed Layers.

Table 1 also demonstrates that the plasticizer loading can be adjusted to not only affect the glass transition temperature but also the flow, resulting in layers with very high flow that are still very stiff at room temperature. For example, Disclosed Layers 5-7 have the same PVOH content and molecular weight, but differing plasticizer loading. As can be seen, as the plasticizer loading is increased, the glass transition temperature decreases (but the layer remains "stiff", i.e., $T_g$ is above about 30° C.) and the flow increases.

Finally, Table 1 also demonstrates that the flow can be increased by lowering the PVOH content of the layers. For example, Disclosed Layer 8 has the same molecular weight and plasticizer content as Conventional Layer 3, but Disclosed Layer 8 has a lower PVOH content. As a result, Disclosed Layer 8 has a significantly increased flow when compared to Conventional Layer 3.

The improvements in resisting defects of the presently disclosed, exemplary interlayers (designated as "Disclosed Interlayers" and as shown as DI 1-16 in Table 2 and Table 3 below) can be most readily appreciated by a comparison to prior art, conventional multilayered interlayers (designated as "Conventional Interlayers" and as shown as CI 1-4 in Table 2 and Table 3 below). As noted above, the skin layers depicted in Table 1 were used to construct various multilayered interlayers as shown in Table 2 and Table 3, with the resultant multilayered interlayer used to construct laminates. The multilayered interlayer has a general construction of skin layer/core layer/skin layer with the two skin layers generally having the same compositions and thicknesses. The thickness of the interlayer is generally 0.81 mm and the thickness of the core layer is 0.13 mm. The laminates

TABLE 1

| Skin Layer | Molecular Weight (Daltons) | PVOH content in PVB (wt %) | Plasticizer (3-GEH) Content in PVB (phr) | Glass Transition Temperature (° C.) | DF135 (microns) | Stress Relaxation Modulus at 150° C. and 100 Seconds (Pascals) |
|---|---|---|---|---|---|---|
| DL 1 | 131600 | 19 | 38 | 30 | 278 | 40 |
| DL 2 | 134360 | 19 | 38 | 30 | 262 | 45 |
| DL 3 | 138960 | 19 | 38 | 30 | 240 | 68 |
| DL 4 | 109750 | 21 | 34 | 37 | 374 | 21 |
| DL 5 | 60000 | 19 | 10 | 58 | 407 | ~2 |
| DL 6 | 60000 | 19 | 20 | 45 | 546 | ~0.5 |
| DL 7 | 60000 | 19 | 38 | 30 | >600 | ~0.1 |
| DL 8 | 150000 | 15.4 | 38 | 26 | 361 | 20 |
| DL 9 | 150000 | 15.4 | 31 | 30 | 277 | 58 |
| CL 1 | 150000 | 19 | 10 | 58 | 15 | >1000 |
| CL 2 | 150000 | 19 | 20 | 45 | 50 | >500 |
| CL 3 | 150000 | 19 | 38 | 30 | 170 | 110-150 |

As Table 1 demonstrates, the Disclosed Layers have significantly improved flow compared to the Conventional Layers, as shown by the results of the DF135 and stress relaxation tests, comparing the Disclosed Interlayers to the Conventional Interlayers. Additionally, Table 1 demonstrates that flow increases with decreasing molecular weight. For example, Disclosed Layers 1-3 and 7 and Conventional Layer 3 have the same PVOH content, plasticizer loading, and glass transition temperature but different molecular weights; and as the molecular weight of the Disclosed Layers decreases, the flow increases. Moreover, Disclosed Layers 5-7 have the same PVOH content, plasticizer content, and glass transition temperature as Conventional Layers 1-3, respectively, but Disclosed Layers 5-7 have a much in Table 2 were made with 2.3 mm clear glass with a 0.13-mm PET film ring in the center, as described above. The laminates were also nip rolled for de-airing. The average surface roughness (Rz) for the random rough surface interlayers was approximately 29 microns; the average surface roughness (Rz) for the embossed surface interlayers was approximately 38 microns. The laminates in Table 3 were also made with 2.3 mm clear glass. The thickness of the PET film ring was again 0.13 mm for samples where nip roll was used for de-airing but 0.18 mm for samples where vacuum bag was used for de-airing. The surface roughness (Rz) varied as shown in Table 3. Post heat surface (Rz) refers to the surface remaining after heating for 5 minutes at 100° C., as previously described.

TABLE 2

| Interlayer | Skin Layer | Surface Topography | Core Layer PVOH Content in PVB (wt. %) | Core Layer Plasticizer (3-GEH) Content in PVB (phr) | Glass Transition Temperature (° C.) | Rate of Iceflower Formation (%) | Area of Iceflower Defect (%) |
|---|---|---|---|---|---|---|---|
| CI 1 | CL 3 | Random rough | 11.8 | 75 | 3 | 50 | 26.7 |
| DI 1 | DL 1 | Random rough | 11.8 | 75 | 3 | 8.3 | 3.8 |
| DI 2 | DL 2 | Random rough | 11.8 | 75 | 3 | 33 | 11.8 |
| DI 3 | DL 3 | Random rough | 11.8 | 75 | 3 | 33 | 8.8 |
| DI 4 | DL 4 | Random rough | 11.8 | 75 | 3 | 0 | 0 |
| CI 2 | CL 3 | Embossed | 11.8 | 75 | 3 | 16.7 | 12.5 |
| DI 5 | DL 1 | Embossed | 11.8 | 75 | 3 | 0 | 0 |
| DI 6 | DL 2 | Embossed | 11.8 | 75 | 3 | 0 | 0 |
| DI 7 | DL 3 | Embossed | 11.8 | 75 | 3 | 0 | 0 |
| DI 8 | DL 4 | Embossed | 11.8 | 75 | 3 | 0 | 0 |

TABLE 3

| Interlayer | Skin layer | Embossed Surface (Rz) | Post Heat Surface (Rz) | De-airing Method | Area of Iceflower Defect (%) | % Reduction |
|---|---|---|---|---|---|---|
| CI 3 | CL 3 | 52 | 38 | Vacuum bag | 22 | 0 |
| DI 9 | DL 1 | 62 | 50 | Vacuum bag | 3 | 86 |
| DI 10 | DL 2 | 52 | 38 | Vacuum bag | 7 | 68 |
| DI 11 | DL 2 | 43 | 27 | Vacuum bag | 10 | 55 |
| DI 12 | DL 2 | 29 | 18 | Vacuum bag | 15 | 32 |
| CI 4 | CL 3 | 52 | 38 | Nip roll | 15 | 0 |
| DI 13 | DL 1 | 62 | 50 | Nip roll | 0 | 100 |
| DI 14 | DL 2 | 52 | 38 | Nip roll | 0 | 100 |
| DI 15 | DL 2 | 43 | 27 | Nip roll | 0 | 100 |
| DI 16 | DL 2 | 29 | 18 | Nip roll | 3 | 80 |

As can be seen in Table 2 and Table 3, there is a significant reduction in iceflower formation as a result of the high flow skin layers. Specifically, in the center of the ring during the iceflower test (which simulates the real world bending gaps), the glass is pressed in by the autoclaving pressure in the standard flow laminate (with the Conventional Interlayers), creating a sagging inside the ring in the total thickness profile of the laminate. When the disclosed high flow interlayer is used, the sagging is significantly reduced, which results in 32% to 86% reduction in iceflower defect formation with 0.18 mm PET film ring and vacuum bag de-airing and 80% to 100% reduction with 0.13 mm PET film ring and nip roll de-airing. In other words, the higher the flow, the less sagging and thus a decrease or elimination of iceflower formation. This relationship between high flow and decreased sagging (i.e., reduction in iceflowers) is further shown in FIG. 4, as previously discussed.

In conclusion, the multilayered interlayers with high flow skin layers described herein have numerous advantages over conventional multilayered interlayers previously utilized in the art. In general, in comparison to multilayered interlayers previously utilized in the art, the multilayered interlayers comprising high flow skin layers as described herein have an increased flow which reduces the formation of defects common in multiple layer panels without sacrificing other properties that one of ordinary skill in the art would expect with an increase in flow. Other advantages will be readily apparent to those skilled in the art.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, a polymer layer can be formed comprising plasticizer content in any of the ranges given in addition to any of the ranges given for molecular weight of the resin, where appropriate, to form many permutations that are within the scope of the present invention but that would be cumbersome to list.

I claim:
1. A polymer interlayer comprising:
   a first polymer layer comprising plasticized poly(vinyl butyral) having a molecular weight less than 140,000 Daltons;
   a second polymer layer comprising plasticized poly(vinyl butyral) having a molecular weight greater than 140,000 Daltons;
   a third polymer layer comprising plasticized poly(vinyl butyral) having a molecular weight less than 140,000 Daltons;
   wherein said second polymer layer is disposed between said first polymer layer and said third polymer layer, thereby resulting in a polymer interlayer having two skin layers and a core layer, and wherein said second polymer layer comprises a higher level of total plasticizer than said first and said third polymer layers, and wherein said first polymer layer and said third polymer layer have a stress relaxation modulus, G'(t), measured at a temperature of 150° C. and a time of 100 seconds, in the range of from 0.10 to 100 Pascals.

2. The polymer interlayer of claim 1 wherein said poly(vinyl butyral) of said first polymer layer and/or said third polymer layer has a molecular weight less than 130,000 Daltons.

3. The polymer interlayer of claim 1 wherein said poly(vinyl butyral) of said first polymer layer and/or said third polymer layer has a molecular weight less than 120,000 Daltons.

4. The polymer interlayer of claim 1 wherein said poly(vinyl butyral) of said first polymer layer and/or said third polymer layer has a molecular weight less than 110,000 Daltons.

5. The polymer interlayer of claim 1 wherein said first polymer layer and/or said third polymer layer has a flow in the range of about 0.19 mm to about 0.37 mm as measured by DF135.

6. The polymer interlayer of claim 1 wherein said first polymer layer and/or said third polymer layer has an embossed post heat surface roughness, Rz, ranging from about 25 to about 55 microns.

7. The polymer interlayer of claim 1 wherein said first polymer layer and/or said third polymer layer has a flow in the range of about 0.19 mm to about 0.26 mm as measured by DF135.

8. The polymer interlayer of claim 1 where each of said first polymer layer and said third polymer layers comprises about 30 to about 60 phr total plasticizer.

9. The polymer interlayer of claim 1 where said first polymer layer and/or said third polymer layer comprises about 30 to about 50 phr total plasticizer.

10. The polymer interlayer of claim 1 wherein said poly(vinyl butyral) present in said second polymer layer comprises about 9 to about 18 weight percent residual hydroxyl groups calculated as PVOH.

11. The polymer interlayer of claim 1, wherein the poly(vinyl butyral) in said first polymer layer and the poly(vinyl butyral) in said third polymer layer each have a residual hydroxyl content of at least 19 weight percent, calculated as PVOH, and wherein the total plasticizer content of each of said first polymer layer and said third polymer layer is not more than 38 phr.

* * * * *